May 11, 1965  OTTO LEISTIKO, JR., ETAL  3,183,128
METHOD OF MAKING FIELD-EFFECT TRANSISTORS
Filed June 11, 1962  3 Sheets-Sheet 1

OTTO LEISTIKO Jr.
CHIH-TANG SAH
INVENTORS

BY

Lippincott, Ralh & Hendrickson
ATTORNEYS

May 11, 1965

OTTO LEISTIKO, JR., ET AL 3,183,128

METHOD OF MAKING FIELD-EFFECT TRANSISTORS

Filed June 11, 1962

OTTO LEISTIKO Jr.
CHIH-TANG SAH
INVENTORS

BY

Lippincott, Ralls & Hendricson
ATTORNEYS 3,183,128
METHOD OF MAKING FIELD-EFFECT TRANSISTORS
Otto Leistiko, Jr., Redwood City, and Chih-Tang Sah, Oakland, Calif., assignors to Fairchild Camera and Instrument Corporation, Long Island, N.Y., a corporation of Delaware
Filed June 11, 1962, Ser. No. 201,599
5 Claims. (Cl. 148—186)

This invention relates to field-effect transistors, more particularly to a new method of making highly reliable field-effect transistors and new devices made possible by the method.

A field-effect transistor operates on very different principles from ordinary transistors. It has a narrow region of semiconductor called the channel, containing two spaced-apart electrodes, one called the drain, and another called the source. Still another region of semiconductor material called the gate is located adjacent to a portion of the channel between source and drain. The gate is of the opposite conductivity type from the channel, forming a PN junction with it. A third electrode is connected to the gate.

When a voltage is applied between drain and source, current flows through the channel. This current flow is controlled by the gate potential. The PN junction between the gate region and the channel is reverse biased, so that there is no appreciable current flow across the junction, making the input impedance to the gate electrode high. A depletion region forms about the PN junction, causing a shortage of majority current carriers in the semiconductor adjacent to the junction. The width of the depletion region varies with the gate potential and therefore with the reverse bias voltage on the gate electrode. The shortage of majority carriers in the channel inhibits channel current flow. In certain field-effect devices, by putting a sufficient reverse bias voltage on the gate electrode, the depletion region becomes wide enough so that it extends the entire width of the channel and source-to-drain current is virtually cut off. This condition is called pinchoff, and the gate electrode voltage necessary to achieve it is called pinchoff voltage.

Current control is thus effected by adjustment of gate electrode voltage with a field-effect transistor. In this way the device can act in a manner similar to that of a vacuum tube, i.e., voltage-controlled. A commercially manufactured device must be made to very critical tolerances, so that a given change in gate electrode voltage has a precise and predetermined effect upon channel current. These tolerances can be achieved only by strict adherence to a particular relationship between the channel region and the gate region, as follows:

First, it is usually very desirable that the channel region contain a relatively low concentration of impurities compared to the gate region. The depletion region extends further in the direction of lower impurity concentration. Current control is most important in the channel region, so the channel should have the lower impurity concentration. More impurities provide more majority current carriers which require a higher gate potential to be depleted. Second, where complete pinchoff is desired, the channel must be very narrow to achieve this with reasonable values of gate electrode voltage. The gate region, therefore, is larger than the channel region so that the overall body of semiconductor has sufficient thickness to be structurally stable.

Since the impurity concentrations in the channel region are particularly critical, it would be advantageous to indiffuse this region. This method of manufacture is known to be relatively well controllable. This is done by doping the crystal during its growth with gate-type impurities. Then the opposite-type (channel-type) impurities are indiffused into a surface region of the device to form the channel region. The inherent error generated in the original doping of the semiconductor material is compounded with the inherent error in the indiffusion of the channel. The devices produced in this way have therefore had a high proportion of rejects due to error in the channel impurity level, particularly when these two inherent errors happen to fall in the same direction.

To avoid this compounded error, another indiffusion method is generally believed in the art to be superior. This method starts with a block of semiconductor material originally grown with channel-type rather than gate-type impurities. Gate-type impurities are indiffused into both sides of the block leaving a thin channel region of the original channel-type conductivity in the center. This method was found to be more reliable than the previous method because the channel impurities are grown rather than indiffused. Impurity level may be more accurately controlled during original crystal growth than during indiffusion.

When the gate region was indiffused from both sides in this way, however, two other critical limitations were introduced: the first was the thickness of the body of semiconductor and the second was the indiffusion depth. Slight deviations in thickness of the body and small errors in the depth of the two gate regions compounded to cause a relatively large error in the depth of the narrow center channel region. Error in diffusion depth in this method is greater because of the long diffusion times required to indiffuse the deeper gate regions. Hence, even though a reduction in reject rate resulted from the more accurate control of channel impurity level, a large number of field-effect transistors were still rejected because of failure to meet the critical restrictions imposed upon the channel dimensions.

Contrary to the general belief in the art that a field-effect transistor with a channel region on the surface was less reliable than those with a center channel, it has now been unexpectedly discovered that much more reliable devices than heretofore available can be made with a channel region at or near the surface by the method of this invention. Starting with a block of semiconductor material having both gate- and channel-type impurities grown in the block, a sufficient amount of the gate-type impurities are outdiffused, leaving a narrow channel region at the surface with a greater concentration of the channel-type impurities. This method takes advantage of the accuracy made possible by doping both the gate region and the channel region during crystal growth. Only outdiffusion rate and time need be controlled to achieve the proper impurity level and size relationship between the channel and the gate regions. It has been found that much more accurate control of outdiffusion can be obtained than was heretofore possible with indiffusion. This invention, therefore, provides a means of making a highly reliable and reproducible field-effect transistor which has characteristics definable within very critical tolerances.

Briefly, the method of the invention begins with the formation of a body of semiconductor material having both P- and N-type impurities. These impurities may be of any known kind: N-types include antimony, arsenic, and phosphorus; P-types include aluminum, gallium, boron, and indium. Aluminum and gallium are preferred P-types when an N-type channel is desired, because they diffuse into or through oxide coatings. The type of impurity chosen for the gate should have a faster outdiffusion rate into or through the oxide (or into the atmosphere, in the case of vacuum outdiffusion) than the other type, and be present in substantially higher concentration, e.g., at least twice, preferably ten times or more.

The body of semiconductor is heated either in an oxidizing atmosphere or in a vacuum at a controlled rate to cause outdiffusion. Outdiffusion will occur at a measurable rate at temperatures above 500° C., for germanium, and about 1000° C. for silicon. If there is no oxide coating on the semiconductor at the start of this operation, such a coating of oxide forms concurrently with the outdiffusion in an oxidizing atmosphere. Certain impurities will diffuse into this oxide; others will not. For the latter kind of impurities, vacuum outdiffusion is used to avoid oxide formation. Outdiffusion is continued until the requisite size channel region is formed at the surface of the body having a net concentration of the channel-type impurities. Even though the faster outdiffusing gate-type impurities are initially present in higher concentration in the channel region, the outdiffusion rates are sufficiently different so that the surface channel region where outdiffusion is fastest soon retains a higher concentration of the slower-outdiffusing channel-type impurities. Where a device is wanted having only one channel surface, the opposite surface, which also outdiffuses, may be removed, leaving an opposite face of substantially unoutdiffused material.

Once the body of semiconductor having the proper relationship between channel and gate conductivity types is prepared as above, three electrodes are connected to the body; the source and drain electrodes are ohmically connected to opposite portions of the channel region, and a gate electrode is ohmically connected to the gate region, completing the device.

It has been found particularly advantageous, before attaching the source and drain electrodes, to indiffuse an extra-heavy concentration of channel-type impurities in the regions directly beneath these electrodes. Better contact can be made to a low-resisitivity region. A high-resistivity region often causes a rectifying contact at the electrode. Furthermore, if the electrodes are aluminum, application of the electrodes will cause the P-type aluminum to contaminate the channel region. If the areas directly beneath the aluminum electrodes are first concentrated with N-type impurities, the channel conductivity after applying the electrodes is still N-type.

Additionally, a thin layer of gate-type impurities may be diffused in from the top in order to bury the channel slightly, if desired. This permits pinchoff from both sides of the channel and cuts the pinchoff voltage requirements.

A more detailed explanation of the invention follows. Reference is made to the drawings, in which.

Figure 1:
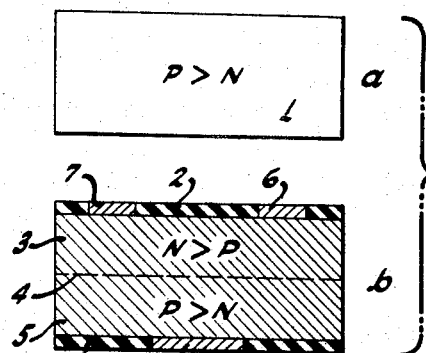
FIGS. 1a and 1b are step-wise, greatly enlarged, schematic representations in transverse section of a semiconductor device made by the method of this invention.

Referring now to FIG. 1, a block 1 of semiconductor material is prepared. In this embodiment of the invention, the block has a greater concentration of P-type impurities than N-type, as shown. The block is usually prepared by growing the P-type and N-type impurities along with the crystal, e.g., silicon, by methods already known in the art. A preferred impurity pair is gallium-phosphorous. The P-type impurity, gallium, outdiffuses faster than does phosphorus, and therefore should be present in the block at a higher concentration than the phosphorus. The specific concentration of each type impurity determines the desired characteristics of the field-effect transistor product. However, gallium, the impurity controlling the conductivity type in the gate region, is generally present in at least twice the concentration of phosphorus, the impurity controlling the conductivity type in the channel. A ratio of 10:1 or more is preferred.

Another way of preparing block 1 is by starting with a block of intrinsic semiconductor material and diffusing both the gate and channel impurities into a part of the block from the surface. In this method, only a part of the block forms the field-effect device. This process is advantageous for integrated solid-state circuitry where other devices are placed in the remainder of the block. If contact with the gate is made from the surface, then the gate impurities need not extend all the way through the block. Finally, the channel is formed at the surface by outdiffusion, as described below.

The block 1 of semiconductor material is then heated so that outdiffusion can take place either in an oxidizing atmosphere wherein a layer of oxide 2 forms simultaneously around the semiconductor, or in a vacuum. Air, oxygen, water vapor, or other well-known oxidizing atmospheres may be used. If silicon is used as the semiconductor, it is preferable to outdiffuse in an oxidizing atmosphere and simultaneously form a protective coating of oxide on the semiconductor. This oxide layer protects the surface during and after manufacture, resulting in improved transistor quality and reliability. Gallium and aluminum, for example—P-type impurities—diffuse into or through an oxide layer very easily. When they are used, an oxidizing atmosphere is therefore preferred. With gallium, outdiffusion is induced by the presence of hydrogen in addition to the oxidizing agent. When a P-type channel region is desired, indium and antimony or phosphorus can be used. Phosphorus and antimony do not readily diffuse through an oxide, so vacuum outdiffusion is used, leaving the slower outdiffusing P-type indium in the surface channel.

The time required for diffusion depends, first, upon the size of the channel region desired, and second, upon the outdiffusion temperature used. This temperature is not critical, although it has been found that diffusion of the usual donor and acceptor impurities is extremely slow at temperatures below about 1100° C. for silicon, or 500° C. for germanium. At temperatures above about 1300°–1400° C., the oxide coating on silicon begins to break down with deleterious effects. Of course, oxide breakdown is not a factor in vacuum diffusion, so higher temperatures may be used. The total time required may be anywhere from a few minutes to many hours. The actual times and temperatures required for a particular semiconductor may easily be selected by one skilled in the art according to the aforesaid general principles.

The device after outdiffusion using, for example, gallium and phosphorus doping in the original crystal, is shown in FIG. 1b. The bottom portion, which also outdiffuses, has been removed to leave the substantially un-outdiffused center portion having a net concentration of P-type impurities on the bottom. Region 3, the channel region, ends up with a greater concentration of N-type impurities than P-type as a result of the outdiffusion. At the point where the net concentration of impurities in the block 1 shifts from N to P is a junction 4. The region 5 below this junction, having a net concentration of P-type impurities, is the gate region. The conductivity types of gate and channel, respectively, may of course be reversed by a different choice of impurities. By processes known in the art, holes are etched in the upper oxide layer 2 for source and drain electrodes 6 and 7. These are spaced apart on the channel region and form the source and drain electrodes. A third electrode 8 contacts the gate region 5 on the lower surface of the body of semiconductor. Alternatively, where there is no oxide, contact can be made directly between the bottom of the device and the bottom of the enclosure. The field-effect transistor is now completed.

Figure 2:
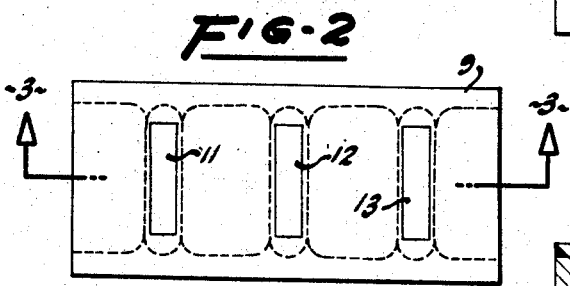
FIG. 2 is a greatly enlarged, somewhat schematic, plan view of a preferred embodiment of this invention.
Figure 3:
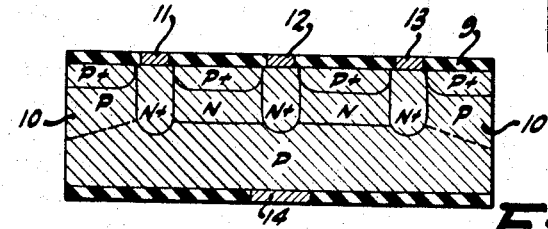
FIG. 3 is a transverse section taken along line 3—3 of FIG. 2.

Various modifications can be made in preferred embodiments of the basic field-effect transistor shown in FIG. 1. Referring to FIGS. 2 and 3, a few such modifications are discussed. In this embodiment, the same block of semiconductor material having a net concentration of P-type impurities (shown in FIG. 1a) is the starting material. Impurities are outdiffused from the block as previously discussed to form an upper surface channel region having a net concentration of N-type impurities. During this outdiffusion, preferably carried out in an oxidizing atmosphere, oxide layer 9 forms on the top surface of the semiconductor body. The lower outdiffused surface and oxide coating can then be removed if desired, by such means as grinding.

In order to surround the channel region completely, gate-type impurities (in this case, P-type) are indiffused from the surface to convert the region 10 (originally part of the outdiffused N-type channel region) to the P-type conductivity shown. In addition to being laterally isolated by region 10, the N-type channel region is also buried by a thin layer of gate-type impurities diffused in from the upper surface, designated as P+. Diffusion time is regulated so that the lateral isolation P-type region 10 diffuses deeper than the surface P+ region and thereby makes contact with the gate region which is also P-type conductivity. Burying the channel region below the surface of the device substantially increases the transconductance. Also, where pinchoff is required, the pinchoff voltage is considerably reduced with a buried channel. Impurities are chosen, preferably, for the P+ regions which diffuse through oxide layer 9 to avoid the necessity of first etching the oxide surface.

Holes for electrodes 11, 12, 13, and 14 are now etched in the oxide. This embodiment of the field-effect transistor has one source electrode 12, two drain electrodes 11 and 13, and a gate electrode 14. By the use of two drains, the channel region is divided into two parts. Combined in parallel, the two smaller channel regions have a higher conductivity than one larger region. This improves the transconductance of the device.

Extra donor impurities which may be of the same kind as the original impurities used to form the channel region, but need not necessarily be, are diffused in through holes 11, 12, and 13. The extra impurities form small regions below the electrodes which are more heavily doped than the remainder of the channel. These regions are designated N+. Ohmic contacts are then made to the N+ region by any of the methods conventionally used in the art. For example, a metal film can be applied and alloyed. The concentration of the N-type impurities used is so high that the net concentration beneath the electrodes is N-type even if the P+ surface layer initially covered the entire surface.

Figure 4:
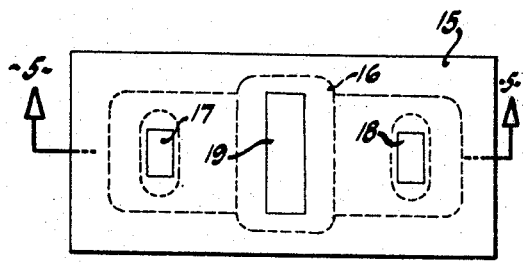
FIG. 4 is a greatly enlarged, somewhat schematic, plan view of an embodiment of the invention where the gate region of a field-effect device is disposed on both surfaces.
Figure 5:
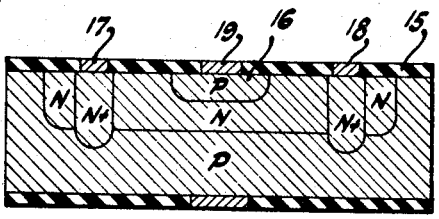
FIG. 5 is a transverse section taken along line 5—5 of FIG. 4.

Another embodiment of the invention is shown in FIGS. 4 and 5. This field-effect device is begun in the same way as previously described. The channel region of N-type conductivity is outdiffused from the block. At this point the upper surface is completely masked, such as with oxide layer 15. A hole is etched in the masking where the upper region of P-type conductivity 16 is desired. At the same time, the P-type region at the sides of the channel may be indiffused as was done in the device in FIGS. 2 and 3. P-type impurities of the type which do not pass through the masking, e.g., boron in the case of oxide masking, are diffused into this region. As seen from FIG. 4, this region extends over the channel region and into the main gate region, which is also of P-type conductivity. In this way, direct contact is made with the main gate region. In this embodiment, therefore, the gate region extends both above and below the channel. The region removes the channel from the surface with the resulting advantages discussed above. Now the N+ regions are indiffused as before for source and drains. The source and drain electrodes are placed as shown at 17 and 18 on either side of gate electrode 19. If desired, the gate electrode may equally well be located on the lower surface of the gate region.

Figure 6:
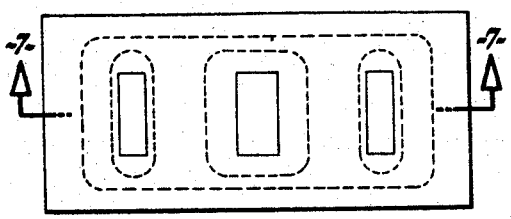
FIG. 6 is a greatly enlarged, somewhat schematic, plan view of an embodiment of the invention having two gate regions, one on each surface of the device.
Figure 7:
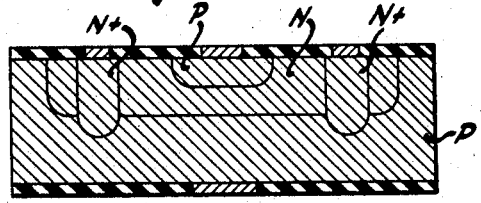
FIG. 7 is a transverse section taken along line 7—7 of FIG. 6.

A variation on the above device having two separate gate electrodes is shown in FIGS. 6 and 7. This device can be made in exactly the same manner as the device shown in FIGS. 4 and 5 except for a change in the location of the indiffused region of P-type conductivity at the upper surface. In this embodiment, this region is completely surrounded by the channel region and does not make contact with the main gate region, as it did in the device of FIGS. 4 and 5. It provides, therefore, a second gate region on the upper surface. Each gate may receive separate signals when the device is used as a mixer, for example. The operation of the device is described below.

Figure 8:
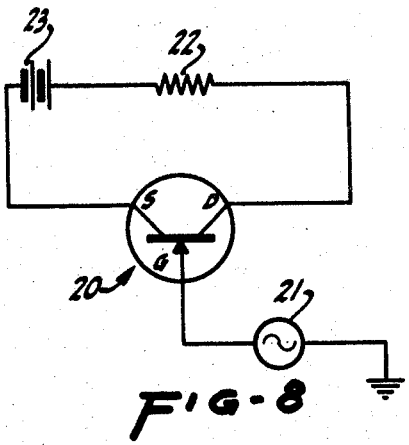
FIG. 8 is a circuit diagram of one possible circuit using the device illustrated in FIG. 1b.

At this point, a brief description of how the field-effect devices of the invention operate is helpful. Referring now to FIG. 8, the field-effect device is illustrated by its standard symbol at 20. Source, drain, and gate are indicated by S, D, and G, respectively. A signal is fed from signal source 21 into the gate G. Using the field-effect device illustrated in FIG. 1b, this signal source should provide a negative voltage signal or pulse. The load, shown by resistance 22, is connected in series with battery 23 between source S and drain D. In this circuit, load current is controlled by the signal voltage at the gate G. By increasing the signal voltage negatively, the load current is reduced. When signal voltage reaches pinchoff, load current is cut off because virtually no current flows between source S and drain D. This illustrates one way of using a field-effect device to control current.

Figure 9:
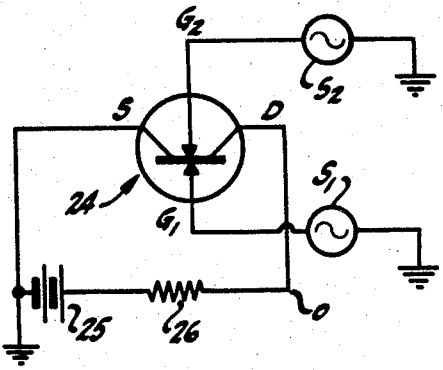
FIG. 9 is a circuit diagram of one possible logic circuit using the device shown in FIGS. 6 and 7.

The device shown in FIGS. 6 and 7 may be used as a logic element. In FIG. 9, this device, shown schematically at 24, operates as an "and" or an "or" gate. Two signals $S_1$ and $S_2$ are fed into gates $G_1$ and $G_2$, respectively. Battery 25 and resistance 26, connected in series across source and drain, provide the load circuit. The signal sources provide pulses, each sufficient to cause pinchoff of the device. Therefore, when either signal sends a pulse, no current can flow through the load circuit because there is an effective open circuit in the channel between source and drain. With no current flow between source and drain, the output O will have a potential substantially equal to the voltage of the battery 25. This voltage will be present at the output when either $S_1$ or $S_2$ sends a pulse which cuts off channel current. The device is therefore an "or" gate. Conversely, if neither source sends a pulse, current will flow from source to drain and the potential at the output O will be essentially zero. If current at output O is used as the measure of output, an output is measured only when neither signal is present. Hence, the device is a "nor" gate. If both signals are inverted prior to going to the gates, when they both send a pulse, the inverters (not shown) invert the signals to no pulse. Current then flows through the channel and current measuring element at output O registers positive. This will occur only when both signals send pulses, hence the device acts as an "and" gate. Many other variations can be made in logic circuitry using the field-effect devices of the invention.

It is often desirable to make multiple field-effect devices. For example, two field-effect devices may be made from the same piece of semiconductor material by the method of this invention. For certain applications, such as differential amplifiers, it is extremely valuable to have two semiconductors which function exactly alike. The two components of a differential amplifier generally subtract one signal from another. When the subtracted signals are identical, their difference must be zero. However, when each component of the amplifier, by virtue of slight differences in construction, has slightly different outputs, the difference is not quite zero. This can be a very serious handicap in highly sensitive instrumentation. Furthermore, semiconductor devices are often very sensitive to temperature variations. If both components are affected by temperature in the same way, as is the case when they are formed from the same body of semiconductor, the sensitivity to temperature changes is far less critical. But when the variance in signal due to temperature variation is different for each signal component, temperature changes will cause serious errors.

Figure 10:
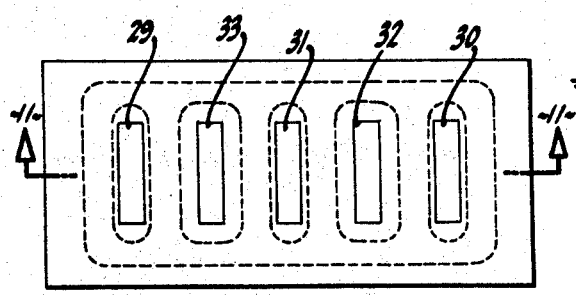
FIG. 10 is a greatly enlarged, somewhat schematic plan view of a device of the invention having three gates and two drains.
Figure 11:
FIG. 11 is a transverse section taken along line 11—11 of FIG. 10.

In FIGS. 10 and 11, a double field-effect semiconductor device made from the same block of material is shown. The device has a main gate region 27, a channel 28, drains 29 and 30, a source 31, and two other gates on the top surface 32 and 33. The device is made by outdiffusing the channel region and indiffusing the upper gate regions and the regions of N+ beneath the source and drain electrodes, as previously explained. This device is used in logic circuits similar to the one shown in FIG. 9, or it may be used as a differential amplifier. A differential amplifier circuit using this field-effect transistor is shown in FIG. 12.

Figure 12:
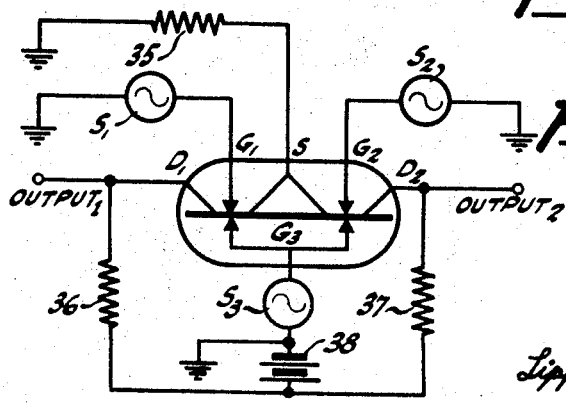
FIG. 12 is a simplified circuit diagram of a differential amplifier using the device illustrated in FIGS. 10 and 11.

The operation of the differential amplifier of FIG. 12 is as follows. Two signals $S_1$ and $S_2$ are fed into the two surface gates $G_1$ and $G_2$ of the device shown by its accepted symbol at 34. Source electrode S is grounded through resistor 35. Drain electrodes $D_1$ and $D_2$ are connected through resistors 36 and 37, respectively, to battery 38 which provides the channel current. The main gate, $G_3$, affects current in both channels, and is therefore shown as two gates connected in parallel. This gate is kept at a predetermined potential by signal $S_3$. This potential is set according to the desired channel current level. The size of the required gate potential of $G_3$ and therefore $S_3$ will vary depending upon the signal strength of $S_1$ and $S_2$ and upon the power of battery 38. When a positive signal voltage is applied at $S_1$, current flows through resistor 35, $S_1$, $D_1$, and resistor 36 (neglecting small reverse currents). Channel current flows out through the common source and resistor 35, putting more positive voltage at S. This increase in voltage changes the relative bias between S and $G_2$ and therefore channel current between the source and $D_2$ is reduced by the field effect; if this positive voltage is sufficient, it can completely pinch off current to $D_2$. As current to $D_2$ decreases, potential at $output_2$ increases. The net effect of a signal at $S_1$, then, is to reduce the potential at $output_1$ and increase the potential at $output_2$. If the potential difference is measured between the two outputs it will be substantially twice the potential of either one. Analogously, the equal but opposite result occurs from a signal at $S_2$. When equal signals are applied at both $S_1$ and $S_2$, the potential difference between the outputs will be zero. When different signals are applied, the potential difference across the outputs will be proportional to, but greater than, the difference of the signals because of the amplification in the amplifier. Hence the device is called a differential amplifier. The signal to $S_3$ can also be A.C. An A.C. signal at $S_3$ is used when both gates of the amplifier are to be affected equally.

It is apparent that the accuracy of the device is dependent upon both sides being identical. When the field-effect semiconductor of FIGS. 10 and 11 is used, the two field-effect portions are made from the same body of semiconductor material, thus immensely improving their likelihood of being identical.

The device shown in FIGS. 10 and 11 may also be prepared with the upper surface gate regions contacting the main gate region, similar to the device shown in FIGS. 4 and 5. The gates are then effectively one. The drains may also be connected by electrodes running over the surface of the oxide layer. Having multiple channels and multiple gates is advantageous, because the combined conductivity doubles, improving transconductance. The combined unit has a better transconductance in non-pinchoff operation and is more like an open circuit at pinchoff.

Figure 13:
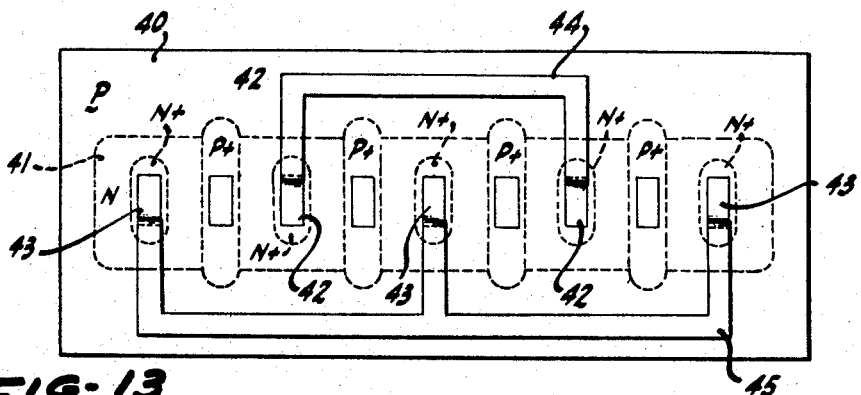
FIG. 13 is a greatly enlarged, somewhat schematic plan view of an interdigitated device of a preferred embodiment of the invention.

FIG. 13 shows another embodiment of the invention. This planar interdigitated configuration is a field-effect device having a main gate 40, a channel 41, and a plurality of P+ gate regions in contact with the main gate as shown. The sources are connected together by metal electrode 44 and the drains by metal electrode 45. If desired, the sources and drain could be interchanged. Where capacitance is a problem, it is desirable to ground the larger electrode to reduce the multiplication of capacitance by the Miller effect.

Effectively, then, the device of FIG. 13 is one field-effect device made by a plurality of source, gates, and drains connected in parallel. Conductivity of this device is very high and pinchoff voltage very low, thus making it an outstanding field-effect transistor. Electrodes 42 and 44 may be placed over the oxide layer by methods known in the art. It is not necessary, however, to connect these electrodes together. If they are not connected, the device is effectively a plurality of separate field-effect devices on the same body of semiconductor. Many types of possible logic elements using the unconnected device are apparent. When used in this way, the P+ regions are made shorter so that they do not extend into the main gate region, and are therefore four separate additional gates. The main gate on the reverse surface is used to control channel current uniformly in the whole device. The four upper surface gates are connected to four separate inputs which can be logically combined by the device; hence, it is particularly useful as a mixer.

There is nothing essential about the rectangular configuration used in the drawings so far. It is preferable, however, whatever configuration is used, to have a silicon body with a planar surface with the junctions of the surface protected by oxide. This gives the devices a high reliability.

Referring back to FIG. 10 for a moment, it will be observed that a small amount of current can flow between source and drain by going around the ends of the P+ gate regions, and therefore be relatively unaffected by them. With these devices, complete pinchoff is hard to achieve. However, by using the circular configuration shown in FIGS. 14 and 15, this small current can be completely eliminated. It is not possible for current to flow in the channel of N-type conductivity between source S and drain D without being affected by the field set up by the P+ region.

Figure 14:
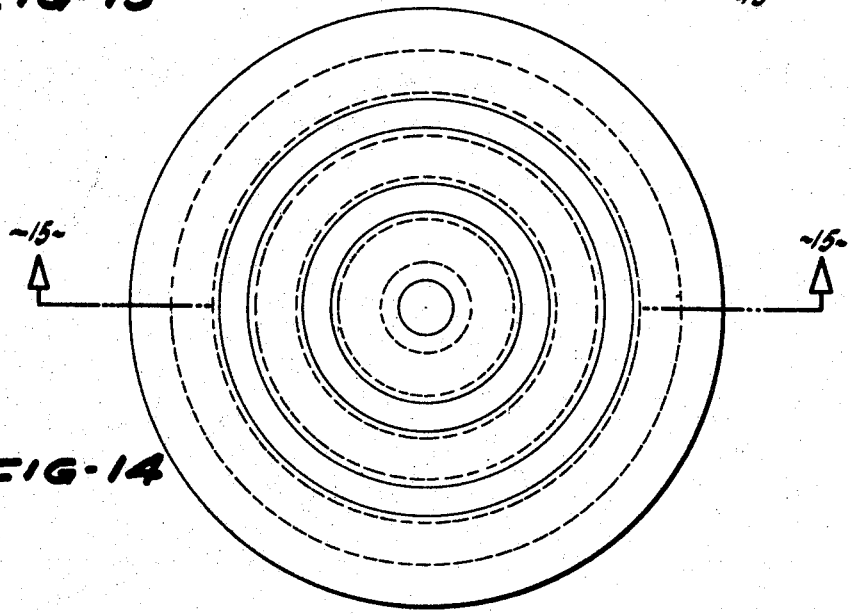
FIG. 14 is a somewhat schematic, greatly enlarged plan view of a circular device of the invention.
Figure 15:
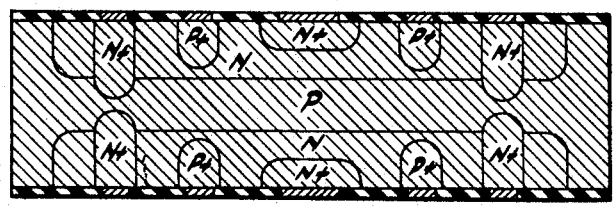
FIG. 15 is a transverse section taken along line 15—15 of FIG. 14.

Using a circular device, when two identical field-effect devices are desired on the same surface of a wafer of semiconductor, these may be diffused adjacent to each other on the same block without loss of reliability. Each device may have multiple concentric drains and multiple concentric gates on the surface. Furthermore, two identical circular devices may also be placed on the same block of semiconductor, as shown in FIGS. 14 and 15. This embodiment has a field-effect device on each surface. The channel region is outdiffused from both surfaces and the P+ and N+ regions diffused into both surfaces, as shown. The resulting double field-effect transistor has both the advantage to low pinchoff voltage due to its circular configuration, and also the advantage of two devices on the same body of semiconductor material which were diffused at the same time. This embodiment is excellent for a differential amplifier.

It is apparent that many variations and applications of the process and devices of the invention may be made by one skilled in the art which are still within the spirit and scope of the invention. Therefore, the only limitations to be placed on the scope of the invention are contained in the following claims.

What is claimed is:

1. Method of making a field-effect semiconductor device which comprises:

forming a body of semiconductor material having both P-type and N-type impurities, each type having different net outdiffusion rates with the concentration of impurities of the type having the greater net outdiffusion rate being substantially greater than the concentration of the other type;

outdiffusing a sufficient portion of the impurities to form a region of semiconductor material at the surface of said body having a net concentration of impurities of the type having the slower outdiffusion rate, while leaving the remainder of said body with a net concentration of the faster type;

masking a central portion of the surface of said surface region and diffusing impurities of the faster outdiffusing conductivity type around said mask to a depth sufficient to make contact with said remainder of said body beneath said surface region, thereby isolating a channel within said surface region of the conductivity type of the slower outdiffusing impurities;

diffusing additional impurities of the slower outdiffusing conductivity type into at least two spaced-apart areas of said channel;

diffusing into said surface region a sufficient amount of impurities of the faster outdiffusing conductivity type to bury the surface of said channel except at said spaced-apart areas; and placing three electrodes in ohmic contact with said body two of which are in contact with said spaced-apart areas of said channel and the other is in contact with an area of the body of opposite conductivity type from said channel.

2. Method of making a field-effect semiconductor device which comprises:

forming a body of semiconductor material having both P-type and N-type impurities, each type having different net outdiffusion rates with the concentration of impurities of the type having the greater net outdiffusion rate being substantially greater than the concentration of the other type;

outdiffusing a sufficient portion of the impurities to form a region of semiconductor material at the surface of said body having a net concentration of impurities of the type having the slower outdiffusion rate, while leaving the remainder of said body with a net concentration of the other type;

masking a central portion of the surface of said surface region with a first mask and diffusing impurities of the faster outdiffusing conductivity type around said mask to a depth sufficient to make contact with said remainder of said body beneath said surface region, thereby isolating a channel within said surface region of the conductivity type of the slower outdiffusing impurities;

masking the entire surface of said body except a central portion of the surface of said channel with a second mask and diffusing sufficient additional impurities of the faster outdiffusing conductivity type into the exposed central portion of the surface of said channel to form a surface gate region of said faster outdiffusing conductivity type at the surface of said channel; and placing three electrodes in ohmic contact with said body, two of which are in contact with spaced-apart portions of the surface of said channel on opposite sides of said central portion and the third is in contact with an area of the body of the opposite conductivity type from said channel.

3. The method of claim 1 wherein said third electrode is placed in contact with said surface gate region.

4. The method of claim 1 wherein said surface gate region is in contact with said remainder of said body.

5. The method of claim 3 wherein said surface gate region is in contact with said remainder of said body.

References Cited by the Examiner

UNITED STATES PATENTS

| | | | |
|---|---|---|---|
| 2,754,431 | 7/56 | Johnson | 317—235 |
| 2,804,405 | 8/57 | Derick | 148—187 |
| 2,815,303 | 12/57 | Smith | 148—191 |
| 2,861,018 | 11/58 | Fuller | 148—190 |
| 2,953,486 | 9/60 | Atalla | 148—191 |
| 2,967,985 | 1/61 | Shockley | 148—191 |
| 2,980,560 | 4/61 | Weiser | 148—191 |
| 2,997,634 | 8/61 | Franke | 317—235 |
| 3,079,287 | 2/63 | Anderson | 148—186 |
| 3,085,033 | 4/63 | Handelman | 148—191 |
| 3,108,915 | 10/63 | Ligenza | 148—187 |

OTHER REFERENCES

Aschner et al.: "Journal of the Electrochemical Society," May 1959, pp. 415–517.

BENJAMIN HENKIN, *Primary Examiner.*

DAVID J. GALVIN, *Examiner.*